(12) United States Patent
Fink et al.

(10) Patent No.: US 8,209,223 B2
(45) Date of Patent: Jun. 26, 2012

(54) VIDEO OBJECT TAG CREATION AND PROCESSING

(75) Inventors: Michael Fink, Brookline, MA (US); Ran Tavory, Haifa (IL); Tamar Rachel Kolodny, Haifa (IL); Natalia Marmasse, Ichud (IL)

(73) Assignee: Google Inc., Mountain View, CA (US)

( * ) Notice: Subject to any disclaimer, the term of this patent is extended or adjusted under 35 U.S.C. 154(b) by 991 days.

(21) Appl. No.: 11/948,643

(22) Filed: Nov. 30, 2007

(65) Prior Publication Data

US 2009/0144772 A1 Jun. 4, 2009

(51) Int. Cl.
*G06Q 30/00* (2012.01)
*G06Q 40/00* (2012.01)
*G06F 15/16* (2006.01)
*G06F 17/30* (2006.01)

(52) U.S. Cl. .......... 705/14.4; 705/4; 705/14; 705/14.52; 705/35; 709/218; 707/765; 725/32; 725/110; 726/1; 715/723; 386/4; 386/52; 386/124

(58) Field of Classification Search ................ 705/4, 14, 705/14.52, 35; 386/4, 52, 124; 707/765; 709/218; 715/723; 725/32, 36, 110; 726/1
See application file for complete search history.

(56) References Cited

U.S. PATENT DOCUMENTS

| | | | |
|---|---|---|---|
| 5,774,664 A | 6/1998 | Hidary et al. | |
| 5,778,181 A * | 7/1998 | Hidary et al. | 725/110 |
| 6,018,768 A * | 1/2000 | Ullman et al. | 709/218 |
| 6,570,587 B1 * | 5/2003 | Efrat et al. | 715/723 |
| 6,591,247 B2 * | 7/2003 | Stern | 705/14.52 |
| 6,642,940 B1 * | 11/2003 | Dakss et al. | 715/723 |
| 7,124,101 B1 * | 10/2006 | Mikurak | 705/35 |
| 7,668,821 B1 * | 2/2010 | Donsbach et al. | 707/765 |
| 2002/0065722 A1 * | 5/2002 | Hubbard et al. | 705/14 |
| 2003/0028873 A1 * | 2/2003 | Lemmons | 725/36 |
| 2003/0040957 A1 * | 2/2003 | Rodriguez et al. | 705/14 |
| 2005/0220439 A1 * | 10/2005 | Carton et al. | 386/4 |
| 2008/0107404 A1 * | 5/2008 | Nakamura et al. | 386/124 |
| 2008/0109306 A1 * | 5/2008 | Maigret et al. | 705/14 |
| 2008/0187279 A1 * | 8/2008 | Gilley et al. | 386/52 |
| 2008/0263583 A1 * | 10/2008 | Heath | 725/32 |
| 2009/0254971 A1 * | 10/2009 | Herz et al. | 726/1 |

(Continued)

FOREIGN PATENT DOCUMENTS

KR 10-2000-0017807 A 10/2000

(Continued)

OTHER PUBLICATIONS

Nick Gonzalez, VIDEO ADS: Every Startup has a different solution, 52 comments. Nov. 26, 2007, pp. 1-14. http://www.techcrunch.com/2007/07/06/video-ads-somebody-needs-to-solve-this-problem.*

(Continued)

*Primary Examiner* — Ella Colbert
*Assistant Examiner* — Barbara Amelunxen
(74) *Attorney, Agent, or Firm* — Fish & Richardson P.C.

(57) ABSTRACT

An indication of an object included in a frame of a video content item is received. A tag is associated with the object, the tag including a reference to a media content item. An additional frame that includes the object is identified in the video content item. The tag is associated with the additional frame in the video content item.

20 Claims, 7 Drawing Sheets

U.S. PATENT DOCUMENTS

2009/0307013 A1* 12/2009 Altounian et al. ............... 705/4

FOREIGN PATENT DOCUMENTS

| WO | WO 02/080555 | 10/2002 |
| WO | WO 02/080555 | * 10/2002 |

OTHER PUBLICATIONS

Catherine Dominguez, BroadRamp technology will make TV shows virtual mall, San Antonio Business Journal, The Essential Business Tool, Jun. 11, 2007, pp. 1-3, http://sanantonio.bizjournals.com/sanantonio/stories/2007/06/11/story3.html.*

Anonymous, Microsoft for Digital Advertising Industry, PR NEWSWIRE, New York, Jan. 13, 2006, pp. 1-4. ProQuest Document ID 968489271.*

Notification Concerning Transmittal of International Preliminary Report on Patentability, PCT/US2008/084982 dated Jun. 10, 2010, 6 pages.

PCT Application PCT/US/2008/0849826, International Search Report and Written Opinion, mailed Jun. 23, 2009, 11 pages.

Ooyala, 'Overview', [online] [retrieved on Aug. 17, 2010]. Retrieved from http://www.ooyala.com/about.

Dominguez, C., 'BroadRamp technology will make TV shows virtual mall', San Antonio Business Journal, Jun. 11, 2007, [online] [retrieved on Nov. 26, 2007]. Retrieved from http://cincinnati.bizjournals.com/sanantonio/stories/2007/06/11/story3.html?t=printable.

Techcrunch, 'Cisco and Click.tv?', Jul. 30, 2007, [online] [retrieved on Nov. 26, 2007]. Reetrieved from http://www.techerunch.com/2007/07/30/cisco-and-clicktv/.

YuMe Networks, 'About Us', [online] [retrieved on Nov. 26, 2007]. Retrieved from http://yumenetworks.com/about.html.

CrunchBase Company Profile, 'ScanScout', Jul. 24, 2007 [online] [retrieved on Nov. 26, 2007]. Retrieved from http://www.crunchbase.com/company/ScanScout.

Astemix Interactive Video, 'Introducing Hypervideo', [online] [retrieved on Nov. 26, 2007]. Retrieved from http://www.asterpix.com/help/learnmore/introducing/.

Techcrunch. 'Hulu Makes First Acquisition; Chinese Video Startup to Form Backbone of New Service', Sep. 12, 2007, [online] [retrieved on Nov. 26, 2007]. Retrieved from http://www.techcrunch.com/2007/09/12/hulu-makes-first-acquisition-chinese-video-startup.

Techcrunch, 'Video Ads: Every Startup has a Different Solution', Jul. 6, 2007 [online] [retrieved on Nov. 26, 2007]. Retrieved from http://www.techcrunch.com/2007/07/06/video-ads-somebody-needs-to-solve-this-problem.

"MeToday Jul. 4, 2007," [online] [Retrieved on Mar. 11, 2011]; Retrieved from the Internet URL: http://www.viddler.com/explore/djsteen/videos/27/; 1 page.

Arrington, Michael, "Hulu Makes First Acquisition; Chinese Video Startup to Form Backbone of New Service," [online] [Retrieved on Mar. 11, 2011]; Retrieved from the Internet URL: http://www.techcrunch.com/2007/09/12/hulu-makes-first-acquisition-chinese-video-startup-to-form-backbone-of-new-service/; 6 pages.

"CrunchBase ScanScout," [online] [Retrieved on Mar. 11, 2011]; Retrieved from the Internet URL: http://www.crunchbase.com/company/ScanScout; 3 pages.

Hendrickson, Mark, "TechCrunch—Time Warner Invests in Video Ads Startup ScanScout," , [online] [Retrieved on Mar. 11, 2011]; Retrieved from the Internet URL: http://www.techcrunch.com/2007/09/09/time-warner-backs-video-ads-through-scanscout/; 6 pages.

Riley, Duncan, "TechCrunch—Contextual In-Video Advertising: ScanScout," [online] [Retrieved on Mar. 11, 2011]; Retrieved from the Internet URL: http://www.techcrunch.com/2007/05/14/contextual-in-video-advertising-scanscout/; 5 pages.

Gonzalez, Nick, "TechCrunch—YuMe Closes $9 Million Series B," [online] [Retrieved on Mar. 16, 2011]; Retrieved from the Internet URL: http://techcrunch.com/2007/10/16/yume-closes-9-million-series-b/; 1 page.

Arrington, Michael, "TechCrunch—AdBrite Makes Brilliant Video Product," [online] [Retrieved on Mar. 11, 2011]; Retrieved from the Internet URL: http://www.techcrunch.com/2007/01/04/adbrite-makes-brilliant-video-product; 12 pages.

Arrington, Michael, "TechCrunch—FuckedCompany's Adbrite Spawn Goes 2.0," [online] [Retrieved on Mar. 11, 2011]; Retrieved from the Internet URL: http://www.techcrunch.com/2007/01/04/adbrite-makes-brilliant-video-product; 5 pages.

Arrington, Michael, "TechCrunch—Cisco and Click.tv?," [online] [Retrieved on Mar. 11, 2011]; Retrieved from the Internet URL: http://www.techcrunch.com/2007/07/30/cisco-and-clicktv/; 4 pages.

Arrington, Michael, "TechCrunch—Click.tv Moves Video Ideas Forward," [online] [Retrieved on Mar. 11, 2011]; Retrieved from the Internet URL: http://www.techcrunch.com/2006/04/16/clicktv-moves-video-ideas-forward/; 6 pages.

"What's Hot on Shopping.com," [online] [Retrieved on Mar. 11, 2011]; Retrieved from the Internet URL: shopping.com; 2 pages.

"Introducing Adap.tv for Advertisers," [online] [Retrieved on Mar. 11, 2011]; Retrieved from the Internet URL: http://www.adap.tv/demo.html; 1 page.

Dominguez, Catherine, "BroadRamp technology will make TV shows virtual mall," [online] [Retrieved on Mar. 16, 2011]; Retrieved from the Internet URL: http://www.bizjournals.com/sanantonio/stories/2007/06/11/story3.html; 3 pages.

"Ooyala Blog: Create the Group," [online] [Retrieved on Mar. 11, 2011]; Retrieved from the Internet URL: http://www.ooyala.com/blog; 11 pages.

Gonzalez, Nick, "TechCrunch—Video Ads: Every Startup Has a Different Solution," [online] [Retrieved on Mar. 11, 2011]; Retrieved from the Internet URL: http://www.techcrunch.com/2007/07/06/video-ads-somebody-needs-to-solve-this-problem/; 8 pages.

* cited by examiner ns with objects in a video content item). The user interface
VIDEO OBJECT TAG CREATION AND PROCESSING

FIELD

This disclosure is generally related to information presentation.

BACKGROUND

Video content is becoming a standard feature of internet websites. The popularity of video content sharing sites, such as YouTube™, has led to an increase in the of websites that include video content.

SUMMARY

In one general aspect, a product displayed in a video may be associated with an advertisement to be presented during playback of the video by playing a video at a device capable of associating a product displayed in a video with an advertisement, receiving user input identifying the product displayed during the playback of the video, receiving user input identifying a URL by which an advertisement for the identified product is able to be accessed, analyzing the video to locate additional occurrences of the identified product in the video, and associating the URL with occurrences of the identified product in the video. The advertisement may be presented at the device during playback of the video for a viewer conditioned upon an indication from the viewer. The indication includes receiving, at the device playing the video, user input identifying one of the occurrences of the identified product displaying (during playback of the video and using the URL associated with the identified product to present, on the device playing the video, the advertisement for the identified product.

In another general aspect, an indication of an object included in a frame of a video content item is received. A tag is associated with the object, the tag in including a reference to a media content item. An additional frame that includes the object is identified in the video content item. The tag is associated with the additional frame in the video content item.

Implementations may include one or more of the following features. The media content item may be a web page, an audio content item, or a video content item. The media content item may be a sponsored-content item associated with the object. The object may be a product and the media content item may be an advertisement promoting the product. The object may be a human face and the media content item may be a web site associated with a human identified by the face.

A frame in an additional video content item that includes the object may be identified. The tag may be associated with the identified frame of the additional video content item.

The video content item may be preprocessed to identify each occurrence of the object in the video content item and to associate an identifier of an additional occurrence of the object with the video content item. Identifying an additional frame of the video content item that includes the object may include processing the identifier of the additional occurrence of the object to identify an additional frame of the video content item that includes the object.

In another general aspect, a video content item may be played. User input from a viewer identifying an object that appears in a flame of the video content item may be received. A tag, including a reference to a media content item, associated with the object may be processed by retrieving the media content item referenced by the associated tag and presenting the retrieved media content item.

Implementations may include one or more of the following features. A tag may be requested if it is determined that the object does not have an associated tag. The tag may be received and associated with the object.

The media content item may be a web page, an audio content item, or a video content item. The media content item may be a sponsored-content item associated with the identified object. The object may be a product, and the media content item may be an advertisement promoting the product. The object may be a face, and the media content item may be a web page associated with a human identified by the face.

One or more objects in the video content item with associated tags may be determined. The one or more objects in the video content item frame having an associated tag may be indicated. Indicating which one or more objects in the video content item frame have an associated tag may include altering the appearance of the one or more objects in the video content item frame. Indicating which one or more objects in the video content item frame have an associated tag may include displaying representations of the one or more objects in the video content item that have an associated tag.

In another general aspect, a representation of an object may be received. A tag including a reference to a media content item may be received. The object may be located in a frame of a video content item. The tag may be associated with the located object in the frame of the video content item.

Implementations may include one or more of the following features. The media content item may be a web page, an audio content item, or a video content item. The media content item may be a sponsored-content item associated with the object. The object may be a product and the media content item may be an advertisement promoting the product. The object may be a face, and the media content item may be a web page associated with a human identified by the face. The representation of an object may be one or more images of an object.

The details of one or more implementations of the invention are set forth in the accompanying drawings and the description below. Other features, objects, and advantages of the invention will be apparent from the description and drawings, and from the claims.

DETAILED DESCRIPTION

Figure 1:
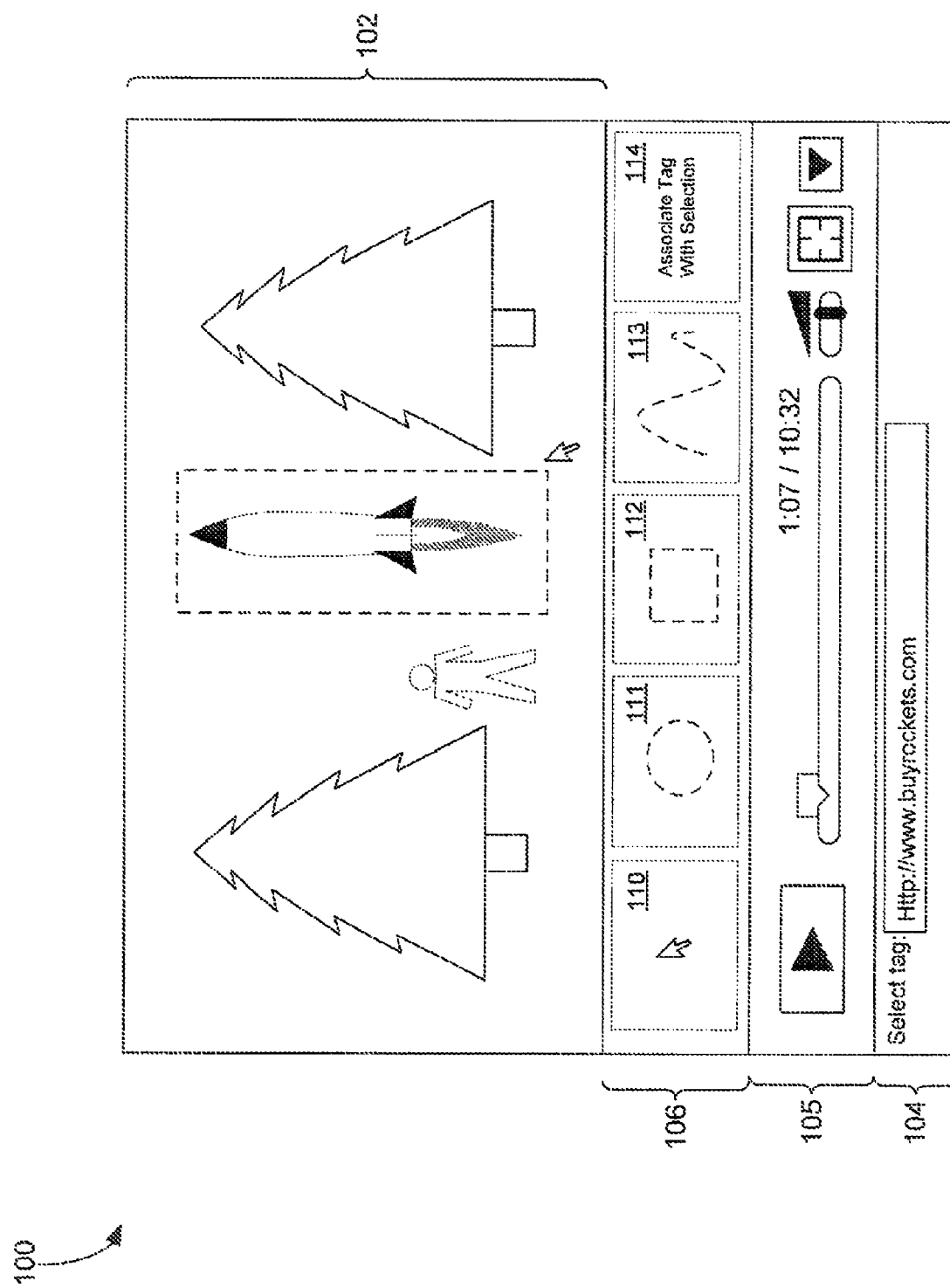
FIG. 1 is an example user interface for associating tails with objects in a video content item.

FIG. 1 is an example user interface 100 for associating tags with objects (e.g., in a video content item). The user interface 100 includes content (e.g., video content item) (display 102, selection tools display 106, media controls display 105, and tag selection display 104. In the example shown, the user interface 100 allows a user to select a frame of a video content item, select an object in the selected frame, and associate one or more tags with the selected object. The tags may include hyperlinks, or references to media content items (e.g., web pages, video content items and audio content items). The tags are then processed when a user later clicks or otherwise selects the object during, the playback of the video content item, causing content associated with the tags to be presented.

For example, an advertiser may wish to include a link to a website associated with the advertiser's product in a video to enable a person who is later viewing the video to activate the link and display the website associated with the advertiser's product. To do so, for or example, the advertiser locates an image of the advertiser's product in the video and identifies a uniform resource locator (URL), a network address or another type of indicator of content to be displayed or presented. In this example, a URL identifies a website associated with the advertiser's product. A tag, another type of a classifying label for data, a pointer to data, or a reference to a data storage location or network address is generated to associate the selected product in the video with the identified URL. Later, when a viewer watching the video online selects the displayed product, the website associated with the advertiser's product and identified by the URL is displayed.

In another example, a museum operator would like to make an interactive video tour of a museum where a viewer is able to select displayed objects in the video tour and have a video describing the selected objects play to provide additional information on that object. To do so, for example, the museum operator would select all image of the object in a frame of the video museum tour and identify a desired video that provides more information on the selected object. A tag would then be generated to associate the desired video with the selected object in the video museum tour. Later, when a viewer is watching the video museum tour and selects the object, the video providing more information is played to the viewer.

In another example, an author would like to make a "choose your own adventure" type of video where a viewer is able to control the direction of the plot by selecting prompts or directions displayed in the video. To do so, for example, the creator of the video would include prompts such as "continue east" or "enter the dungeon" in the video. The creator would then select the prompt in the video, and create a tag to associate with the selected prompt. The tag would refer to another video that related to making, the selection indicated by the prompt. Later, when a viewer viewing the video makes a plot decision by selecting a prompt, the video associated with the prompt is played and the viewer continues on the adventure.

In some implementations, a "video content item" is an item of content that includes content that call be perceived visually when played, rendered, or decoded. A video content item includes video data, and optionally audio data and metadata. Video data includes content in the video content item that can be perceived visually when the video content item is played, rendered, or decoded. Audio data includes content in the video content item that can be perceived aurally when the video content item is played, decoded, or rendered. A video content item may include video data and any accompanying audio data regardless of whether or not the video content item is ultimately stored on a tangible medium. A video content item may include, for example, a live or recorded television program, a live or recorded theatrical or dramatic work, a music video, a televised event (e.g., a sports event, a political event, a news event, etc.), video voicemail, etc. Each of different forms or formats of the same video data and accompanying audio data (e.g., original, compressed, packetized, streamed, etc.) may be considered to be a video content item (e.g., the same video content item, or different video content items).

An advertisement or an "ad" refers to any form of communication in which one or more products, services, ideas, people, organizations or other items are identified and promoted (or otherwise communicated). Ads are not limited to commercial promotions or other communications. An ad may be a public service announcement or any other type of public notice, such as a public notice published in printed or electronic press or a broadcast. An ad may be referred to or include sponsored-content.

An object refers to any visually distinguishable area or region displayed in a video content item. For example, objects may include, items, faces, products, people, characters, animals or other creatures, places, and displayed text. Objects may also include doorways, paths, roads, or displayed areas of consistent color or hue.

The user may view the current frame of a video content item in the video content item display 102. The playback of the video content item and the current displayed frame may be controlled using the controls in the media controls display 105.

The selection tools display 106 contains various selection tools available to the user to select objects in the selected frame of the video content item. As shown, the selection tools display 106 contains a pointing tool 100, a circular selection tool 111, a rectangular selection tool 112, and a freeform selection tool 113. The pointing tool 110 may be used to directly select an object in a frame of the video content item. The circular selection tool 111, rectangular selection tool 112, and the freeform selection tool 113 may be used to define an area in the video content item frame. Objects falling within the defined area may then be marked as selected.

The tag selection display 104 is used to select or define the tag that the user desires to associate with the selected object. The tag selection display 104 may contain a list of predefined tag options to select from. For example, the user may be presented with a list of typical actions such as open URL, play media file, etc.

Depending on the type of tag selected by the user, further options may be presented to the user for selection. For example, if the user selects a URL to be displayed when the object is selected, the user may be asked if the user wants the URL to interrupt the playback of the video content item, or open the URL in a separate browser window. Similarly, if the user selects text to be displayed, the user may be asked to specify the shape and location of a text box display.

Using the media controls in the media controls display 105, the user selects a frame of the video content item for object selection. In the example shown, the user has advanced the video content item to the frame at time 1:07. The selected frame displayed in the video content display 102 contains several objects that may be selected including two trees, a person, and a rocket. In one implementation, the selectable objects may be detected and highlighted showing the user that the objects are available for tagging. In yet another, implementation, the selectable objects may be displayed in a separate window for selection. In yet another implementation, the user may select any object in the video content item frame using any of the provided selection tools independent of any object highlighting or separate object window features that may or may not be implemented.

Using one or more of the selection tools provided to the user in the selection tools display 106, the user may select an object in the video content item display 102. In the example shown, the user has selected the rocket object using the rectangular selection tool 112.

After the user has selected the rocket object, the user may enter the desired tag to associate with the rocket object in the tag selection display 104. In the example shown, the user specifies that the website corresponding to the URL "http://www.buyrocket.com" be displayed to the user, allowing the user to purchase a model of the displayed rocket. After the user has selected the tag, the user may associate the tag with the object by selecting the associate tag with object 114 button, for example.

In some implementations, once the URL has been associated with the rocket object, other frames of the video content item may be searched for further occurrences of the rocket object. The selected tag may be associated with occurrences of the object in additional frames, which may help to ensure that the user can interact with the object. For example, a frame of a video content item is only displayed to a viewer typically for a fraction of a second. Associating a selected tag with multiple occurrences of the object in additional frames may help a user select a tag, associated with one of the occurrences of the object. To associate a selected tab with occurrences of the object in additional frames, the frames of the video content item are analyzed using a variety of object recognition techniques to locate the object in additional frames. The located objects may then be associated with the tag automatically (i.e., without further input from the user) or the user may be prompted to accept the each of the proposed associations and determine whether the association of the tag with an instance of the located object is to be made.

In other implementations, the video content item may have been preprocessed to locate objects in the frame of the video content items prior to viewing. During preprocessing, occurrences of the same object in the video content item are identified using object recognition techniques. Identifiers of the located objects and similar objects are stored or associated with the preprocessed video content item. The identifiers may contain the frame location of each object in the video content item along with a cross reference to the frame locations of additional occurrences of the object, for example.

Continuing the example described above, the identifier associated with the selected rocket object is retrieved and processed to identify the frame locations of further occurrences of the object. The occurrences of the object may be associated with the selected tag.

Figure 2:
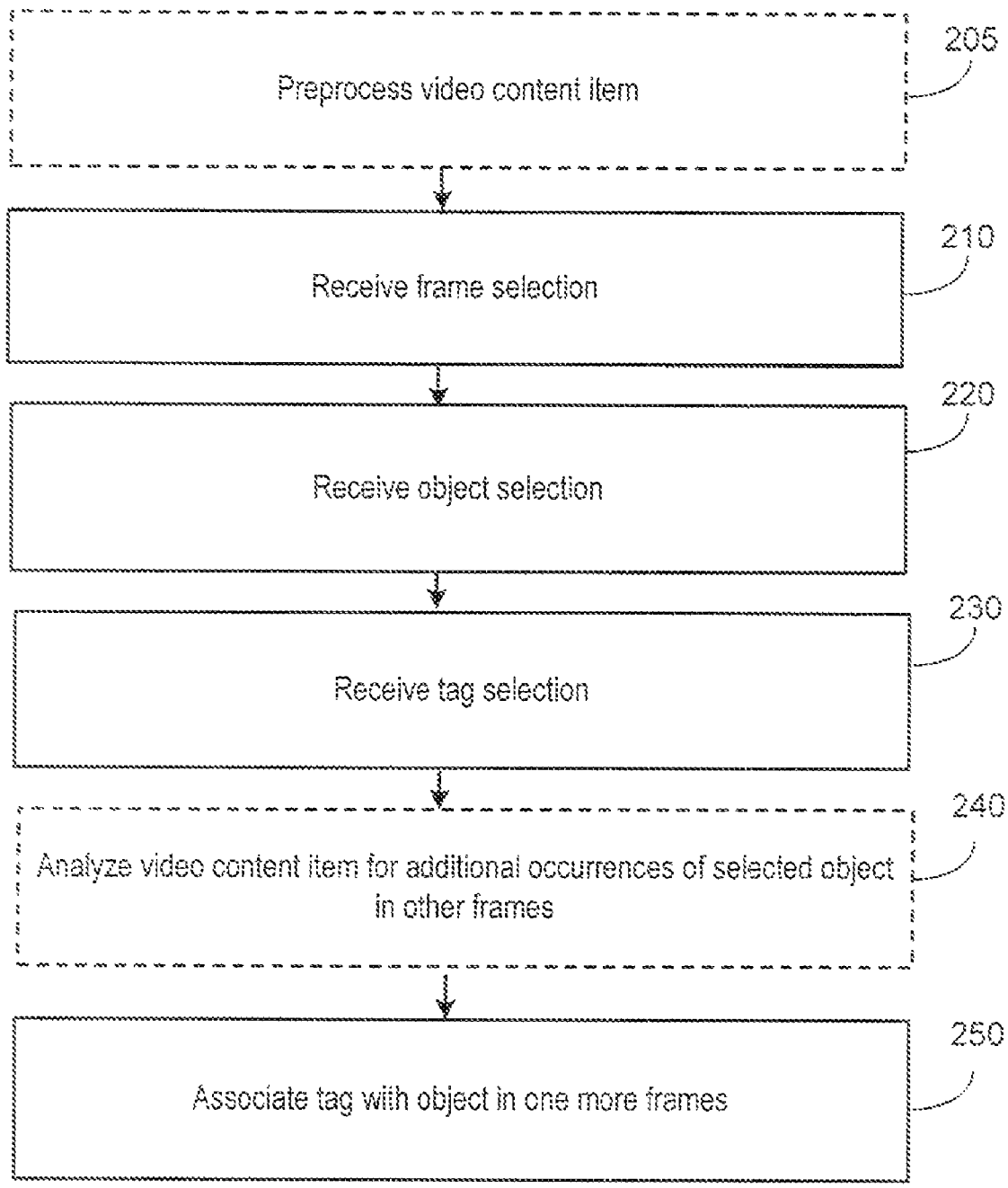
FIG. 2 is a flow diagram of an example process flow for associating a tag with an object in a video content item.

FIG. 2 is a flow diagram of all example process flow 200 for associating a tag with all object (e.g., in a video content item). A video content item may be preprocessed to locate objects (205). Frames of the video content item may be processed to locate objects within the frames. Located objects may be analyzed using object recognition techniques to determine instances of the same object. Computer-readable identifiers may be associated with the preprocessed video content item to allow objects, and instances of the same object, to be identified in the video content item frames.

A frame selection is received from a user (210). The frame selection may be received from a user device through a user interface 100, for example.

An object selection is received from a user (220). To associate an object in the selected frame with a tag, the user identifies or selects the object and the object selection is received by the user device though the user interface 100. For example, an advertiser may wish to associate a product website with images of the product that appear in the video content item. This may be accomplished, for example, by the selecting an object in the frame using, one or more selection tools shown in selection tools display 106.

A tag selection is received from user input (230). This may be accomplished, for example, by a user interacting with the tag selection display 104. The tag may comprise a variety of data items including, but not limited to a URL, a reference to an audio content item, or a reference to another video content item, for example.

The tag may also have associated data or metadata that specifies how the tag should be handled or processed. For example, the tag may have data that specifies if the tag should open in a separate window, interrupt the video file, or wait until the video content item is finished to be displayed.

The video content item may be analyzed to find occurrences of the object in frames of the video content item (240). In one implementation, the frames of the video content item are saved in a database. Frames in the database are then analyzed to find the selected object using a variety of image recognition techniques. When the selected object is a face, additional facial recognition techniques may also be used. Where the object selection was one or more images, the images are similarly compared with the stored video content item frames using image recognition techniques.

In some implementations, the video content item may have been preprocessed to locate objects and instances of the same objects in the frames of the video content items (205). Rather than analyze additional frames of the video content item for the selected object computer-readable identifiers of tie objects in the preprocessed video content item are retrieved and processed. The identifiers identify the frame location of the objects in the video content item that are instances of the selected object.

The selected tag is associated with the object in the video content item (250). The tag and associated tag data may be saved along with the video content item in a video content item storage, for example. The tag data may be saved as a separate file, or may be embedded into the video content item (e.g., saved in metadata or encoded into the video content item). Alternatively, the tag and associated data are saved separately.

Additionally or alternatively, a user may submit an image or images of a desired object to identify an object to be associated with a tag. Instead of selecting a frame of the video content item (210) and selecting an object from the frame (220), the user may submit content or otherwise identify an image of an object. The video content item may then be analyzed to find occurrences of the object from the image (240). For example, all advertiser of a particular brand of soda may present one or more images of the soda, rather than select the soda from a particular frame. The images of the soda may be presented in an image file. The video content item may then be analyzed to find occurrences of the soda image. Occurrences of the soda image in the video content item may then be associated with a tag provided by the advertiser. Alternatively, where the video content item is preprocessed, the object identifiers may be processed to find the additional occurrences of the image.

Figure 3:
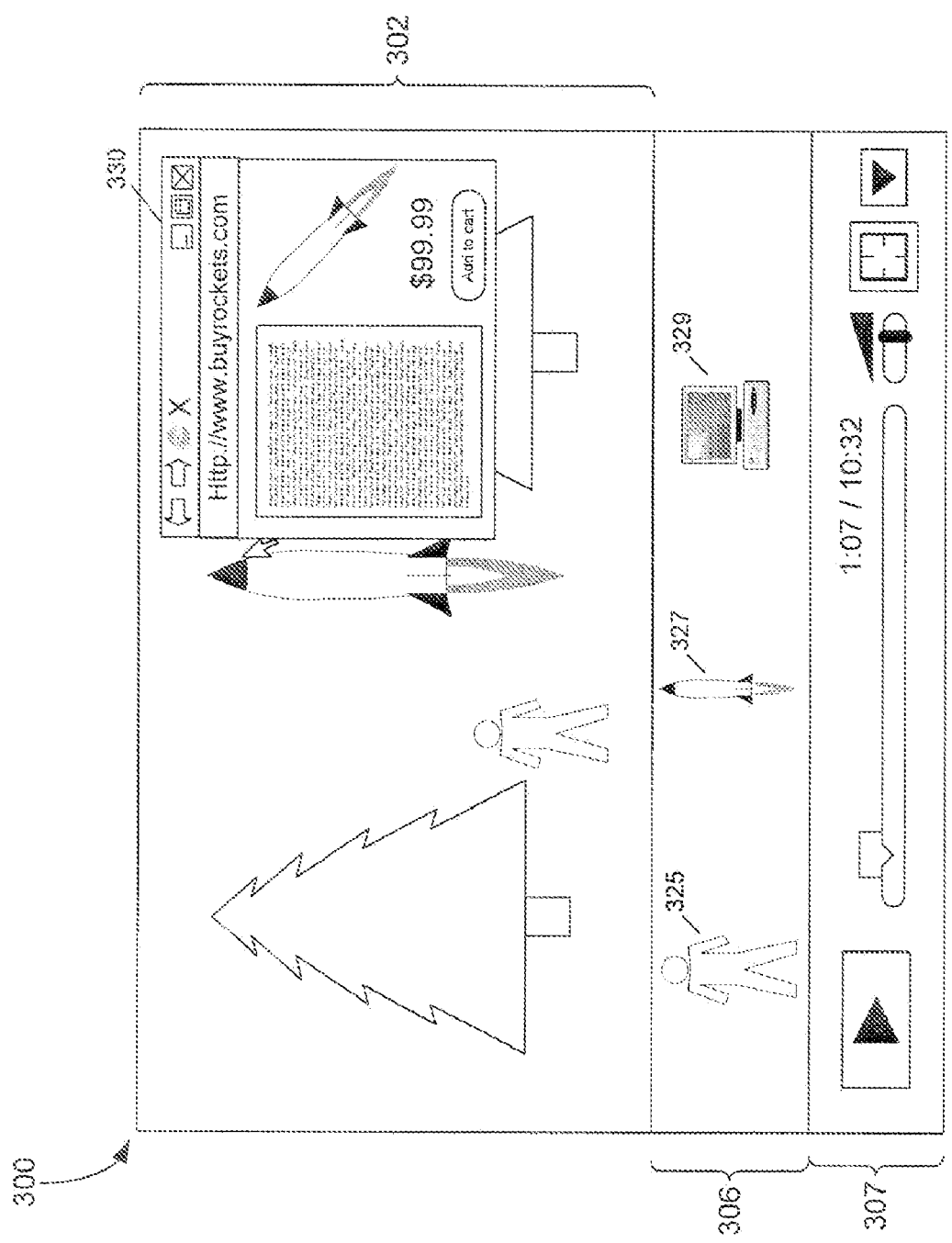
FIG. 3 is a example user interface for playing and interacting with a video content item including tags.

FIG. 3 is an example user interface 300 for playing and interacting with a video content item including tags. The user interface 300 controls the playback of video content items that have associated tags. The tags may have been created and associated with objects in the video content items using a user interface 100 as described previously with respect to FIG. 1 for example. The user interface 300 includes a video content display 302 where the frames of the video content item are displayed. Through the video content display 302, a user is able to interact with objects in the frame of the video content item using a mouse or other selection device. The user may control the playback of the video content item using the various controls shown in the media control display 307, for, example.

The user interface 300 further includes an object display 306 to display objects from the video content item frames that have an associated tag. In some implementations, the objects in the object display 306 correspond to objects shown in the current frame of the video content display 302. In another example, the objects persist in the object display 306 after the objects appear in one or more video content item flames. Persisting the objects in the object display 306 allows a user to select an object at a later time in the video content item, or to select an object that may have appeared in the video content item for a short time. In yet another example, an indication of an object associated with a tag may be presented independently of the appearance of the object in the video. A listing of all tagged objects or images of tagged objects may be presented during playback of the video content item regardless of when an object first appears in the video content item.

In the example illustrated by FIG. 3, a user interacts with the video content item playing in the video content item display 302. The user has identified (by clicking or otherwise selecting) the rocket object. The tag associated with the rocket object is retrieved. The tag may be retrieved from the video content item or retrieved from a separate file or location associated with the video content item. After retrieving the tag for the rocket object, the tag may be processed by retrieving and presenting data referred to by the tag. In this example, the tag referred to the website at the URL "http://buyrocket.com" where a model of the rocket shown in the video content item can be purchased. The website was retrieved and presented in the browser 330.

Objects that have associated tags may be displayed separately in the object display 306. In this example, there are three objects shown: a human 325; a rocket 327; and a computer 329. When an object appears in the object display 306 the user is made aware that there is a tag associated with the object. The user may then click on the object in the video content item display 302, or on the object in the object window 306.

Figure 4:
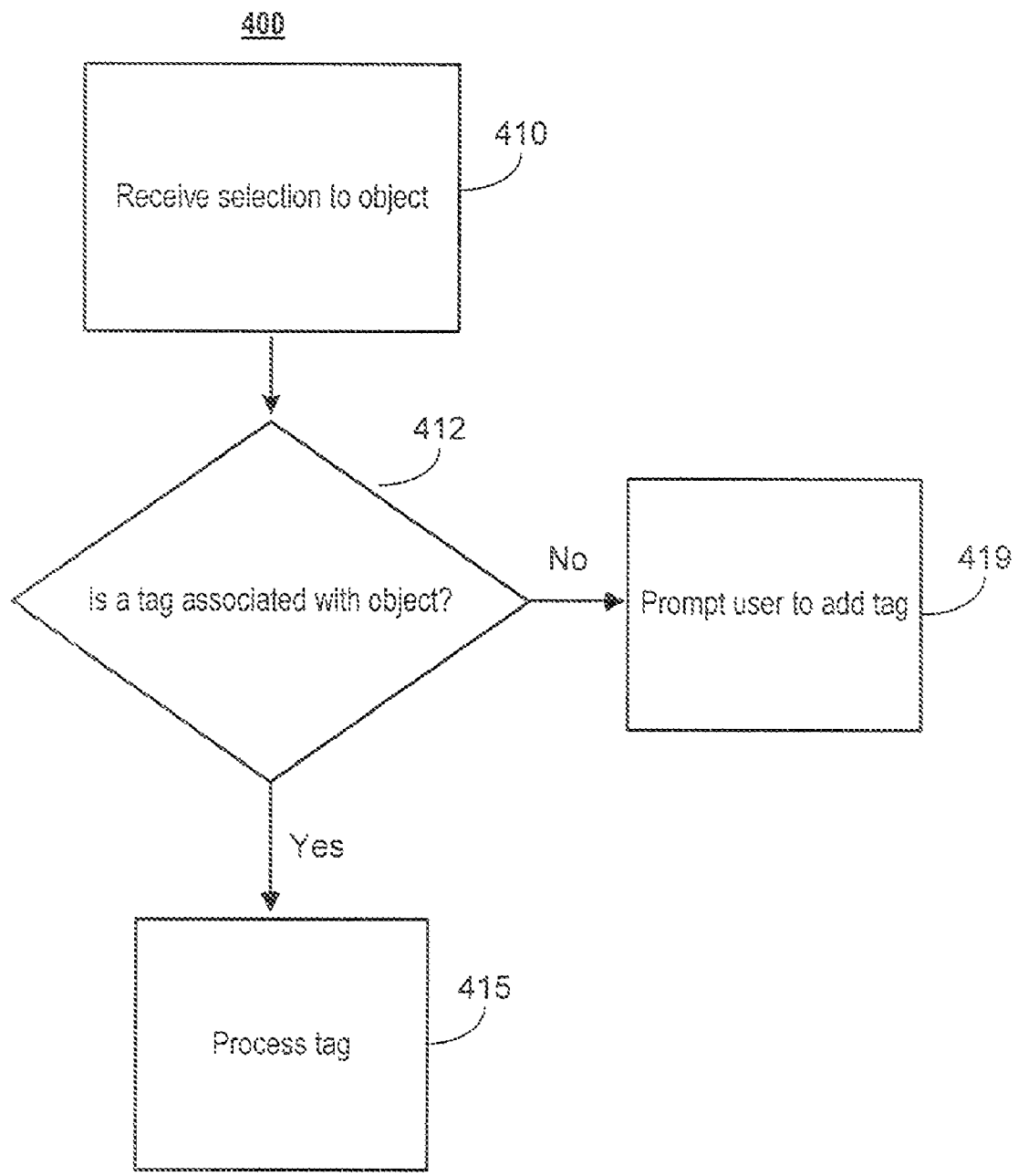
FIG. 4 is a flow diagram of an example process flow for processing a tag associated with an object in a video content item.

FIG. 4 is a flow diagram of an example process flow 400 for processing a tag associated with an object in a video content item. A selection is received from a user to an object in a frame of a video content item file (410). The selection may be received to an object in a frame of a video content item playing in a user interface 300, for example.

A determination is made as to whether a tag is associated with the selected object (412). This may be accomplished, for example, by retrieving data associated with the video content item that includes identifiers of the objects that have associated tags, along with their associated tags. An object may be identified by its frame number and frame location, for example.

In some implementations, the determination of whether an object is associated with a tag is made before receiving a selection. The determination may be made by preprocessing the video content item before viewing, or by processing the video content item as it is viewed. The objects with associated tags in the video content item may then be highlighted to convey to a viewer that the object has associated tag data. For example, the objects may be shown in an object display window 306, as described above with respect to FIG. 3.

Conditioned upon a determination that a tag is associated with the selected object, the tag is retrieved and processed (415). How the tag is processed depends on the media type or format of the tag. If the tag is a hyperlink, then a browser may open on a user device and process the hyperlink by retrieving and displaying the data referenced by the hyperlink. If the tag is a reference to a video content item, then the content referred to by the reference may be retrieved and played, for example.

If a determination has been made that a tag is not associated with the selected object, the user may be prompted to create or select a tag for the selected object (419). If the user elects to create a tag for the selected object, then the user may be further prompted to supply the desired tag. The desired tag may then be associated with the object in the video content item as described with respect to FIG. 2, for example.

Figure 5:
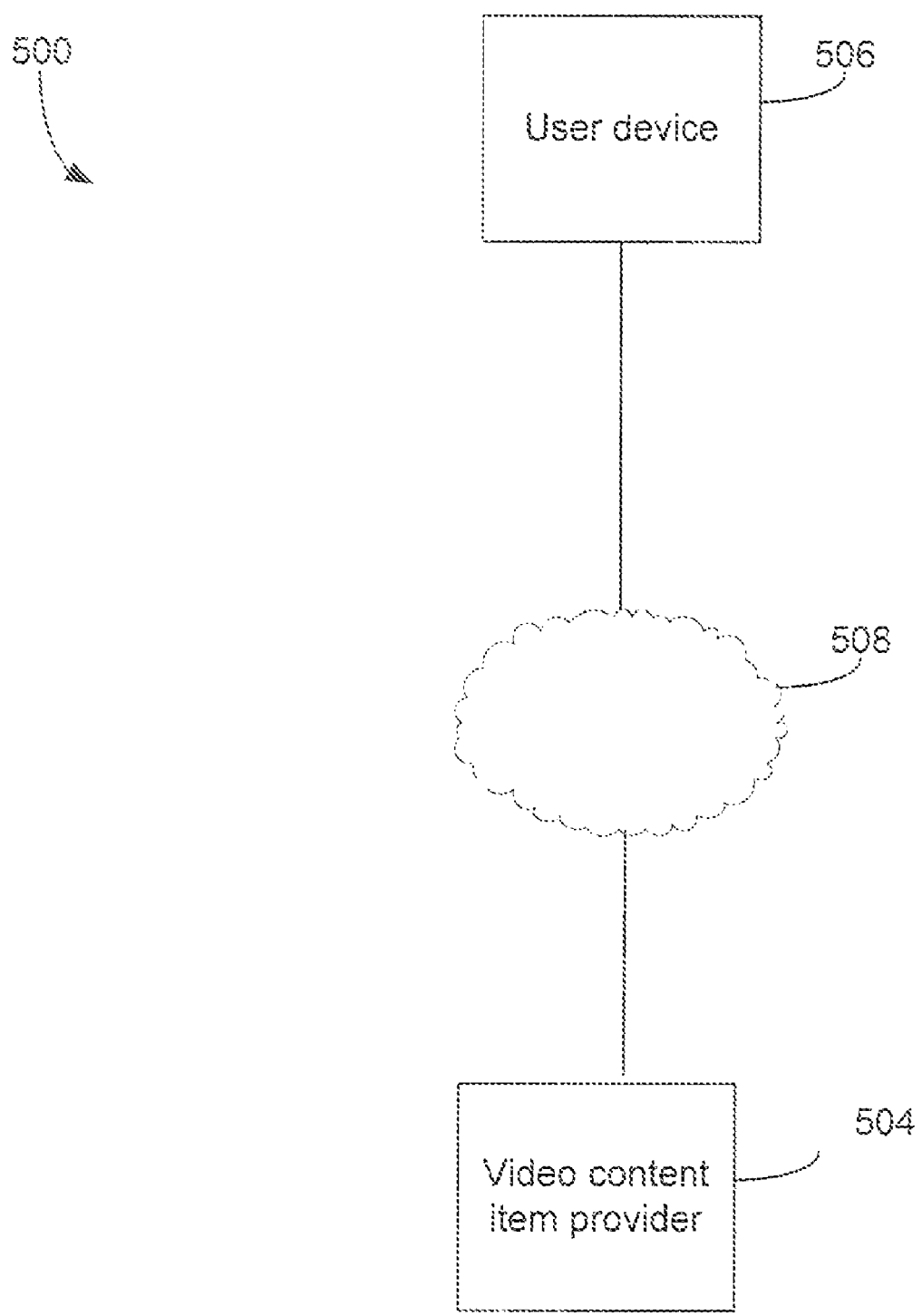
FIG. 5 is a block diagram illustrating an example environment for providing video content.

FIG. 5 is a block diagram illustrating an example environment 500 for providing video content. The environment 500 for providing video content includes, or is communicably coupled with, a video content item provider 504 and one or more user devices 506, at least some of which communicate across network 508. In general, the video content item provider 504 sends video content items to user devices 506 across network 508. The video content items may be downloaded to the user device 506 prior to viewing, or may be streamed and viewed as portions of the video content item arrive.

The environment 500 includes one or more user devices 506. The user device 506 can include customer premises equipment which is used at a residence or place of business (e.g., computers, video players, video-capable game consoles, televisions or television set-top boxes, etc.), a mobile telephone with video functionality, an automobile video player, a portable audio device, a portable game device, or another type of device that plays, video content and can access content via network 508.

The network 508 facilitates wireless or wireline communication between the video content item provider 504 and any other local or remote computers (e.g., user device 506). The network 508 may be a public network such as the internet. The network 508 may be all or a portion of an enterprise or secured network. In another example, the network 508 may be a virtual private network (VPN) between the video content item provider 504 and the user device 506 across a wireline or a wireless link. Examples of network 508 include a local area network (LAN), a wide area network (WAN), a wireless phone network, a Wi-Fi network, and the Internet.

Although illustrated as a single or continuous network, the network 508 may be logically divided into various sub-nets or virtual networks without departing from the scope of this disclosure, so long as at least a portion of the network 508 may facilitate communications between the video content item provider 504, and at least one client (e.g., user device 506).

The user device 506 is operable to play video content items with associated or embedded tags. These tags may be associated with one or more objects displayed in frames of the video content item. The user device 506 is configured to receive selections to objects displayed in the video content item when the video content item is played. The user device 506 is further configured to retrieve and process a tag associated with the selected object. The tag may include one or more references to a wide variety of content items, such as audio content, web content, video content, advertising content, or text.

For example, the user device 506 may be displaying a video content item that includes a particular sports car. When a user selects the sports car shown in the video and the selection is received by user device 506, a tag associated with the sports car is retrieved. The tag may persist in the video content item itself, the video content item provider 504, or may be retrieved from another location. The tag may contain a hyperlink. In this example, the hyperlink may refer to an advertisement website associated with the manufacturer of the car.

Some user devices 506 may be further configured to allow users to generate tags to assign to objects in video content items. The user device 506 may receive a selection to an object in the video content item. The user device 506 may also receive a tag to associate with the object. For example, a publisher of a book may wish to associate the book in a video content item with a URL of an advertisement website where the book may be purchased. Accordingly, the publisher may use one or more selection tools to select the book in a frame of the video content item and provide the desired website as a tag.

The user device 506 may be further configured to analyze additional frames of the video content item to locate additional occurrences of a selected object. After receiving a selection to a desired object, the user device 506 may analyze additional frames of the video content item to locate the object in other frames of the video content item. For example, after receiving the selection to a book from a publisher in a current frame of the video content item, the user device 506 may compare the selected book object with other objects in the video content item to find matching objects. Any object that matches the selected object with a high enough probability may be associated with the provided tag.

The user device 506 may be further configured to read or retrieve computer-readable identifiers associated with a preprocessed video content item. The video content items may be preprocessed to identify objects in the frames of the video content items, as well as instances or occurrences of the same object. The instances or occurrences of the same objects may be identified by analyzing the identified objects using object or image recognition techniques. Identifiers of the located objects and the instances of the objects are associated with the video content items during preprocessing. By reading or retrieving the identifiers, the user device 506 may locate selected objects, and instances of the selected objects, without performing at the user device the object analysis to identify additional occurrences of the object.

The user device 506 is further configured to receive object selections in the URL with images. These images may be presented to the device in the form of image files. The received images are then used to search for matching objects in frames of the video content item.

For example, a publisher of a book may wish to associate an advertisement URL with images of the book in a video content item. Rather than select the book in a frame of the video content item, the publisher may present one or more images of the book to the user device 506. The images may include various pictures of the book including, the front and back jacket. The publisher may upload the pictures as image files. The uploaded images of the book are then compared with the frames of the video content item to locate a match. Any matching object may then be associated with the publisher's advertisement website, such that when a later user selects the image of the book in the video content item they are directed to the website.

The video content item provider 504 is configured to store video content items and analyze frames of video content items to locate objects. The video content item provider 504 may be further configured to preprocess video content item frames to locate objects and instances of located objects within the frames. The video content item provider 504 may then generate and associate computer-readable identifiers with the video content item. The identifiers may be retrieved during playback of the video content item and used to locate the object and instances of the objects in the video content item without further frame analysis.

Figure 6:
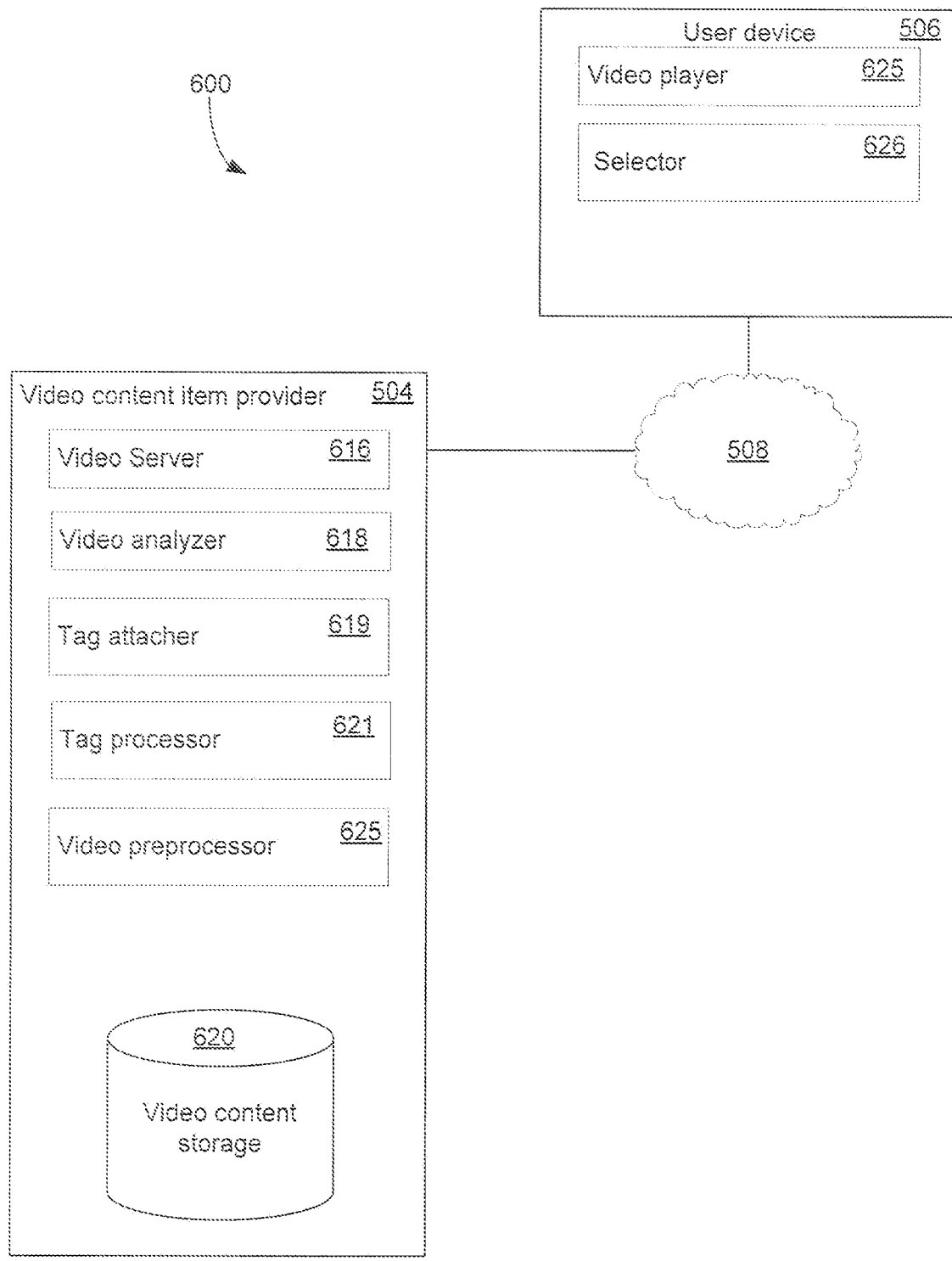
FIG. 6 is a block diagram illustrating an example environment in which interactive video content is created and distributed.

FIG. 6 is a block diagram illustrating an example environment in which video content is created and distributed. The environment 600 includes one or more user devices 506 and video content item providers 504. The various user devices 506 and video content item providers 504 may communicate through a network 508.

The video content item provider 504 may include several components. These may include, but are not limited to, a video server component 616, a video analyzer component 618, a tag attachment component 619, a tag processor component 621, and a video content item storage 620. Although the components are described as being part of a single video content item provider 504, each component may execute on one or more video content providers 504. In addition, while the components are described with respect to the video content item provider 504 only, the components are capable of functioning as part of the user device 506.

The video server component 616 streams or otherwise sends video content to one or more user devices 506. The video server component 616 may receive a request for a video content item from the user device 506. The video server component 616 may then retrieve the requested video content item from the video content storage 620, for example. The retrieved video content item may then be delivered to the user device 506 through the network 508.

The video analyzer component 618 analyzes video content item frames to locate selected objects. The video content item provider 504 may take a selection or image of a desired object and analyze frames in a one or more selected video content items to locate the object or similar objects. The video analyzer 618 may conduct the analysis using an object selected from a frame of the video content item, or may conduct the analysis using an image or images of the desired object. In some implementation's, each frame, or some sampling of frames, of a video content item are stored in a database. such as video content storage 620, for example. An image of a selected object, or some representation, is then compared against the frames in the database. Frames that are found to contain the object within a threshold probability are selected as matches.

The tag attachment component 619 associates tags with objects identified in video content item frames. A user may select an object in a video content item frame to associate with a tag. The tag attachment component 619 may store the tag along with each associate video content item frame in the video content storage. The tag may be embedded into the video content item, or stored separately to preserve the integrity of the video content item.

The tag processor component 621 processes a tag associated with a selected object in a video content item. When a selection is received to an object in a video content item with an associated tag, the tag is processed. How the tag is processed depends on the type of data or content item the tag represents. Where the tag is hyperlink, a browser window may be opened to process the hyperlink on the user device 506, for example. If the tag specifies that an audio file be played, then the specified audio file is retrieved (if necessary), and sent to the user device 506, for example.

The video preprocessor component 625 preprocesses a video content item to locate objects and identify additional occurrences of the objects in the video content item. Located objects in the video content item are analyzed using object and image recognition techniques to objects that appear in the video content item multiple times. Computer-readable identifiers are generated that contain a frame location for each object as well as a cross reference to additional occurrences of that object. The computer-readable identifiers are then associated with the video content item by storing them with the video content item in video content storage 620, for example. The identifiers may then be used by a later user device 506 or video content item provider 504 to locate additional occurrences of a selected object in the video content item without performing a frame analysis.

The video content storage 620 stores the video content items for retrieval. The video content storage 620 may be implemented as a database where each video content item may be stored as a single file, individual frames, or some combination of both.

The video content storage 620 may be part of the video content item provider 504, or exist on a separate computer. Additionally, any tag data associated with one or more objects in a video content item may also be stored in the video content storage 620.

The user device 506 may include several components. These may include, but are not limited to, a video player component 625, and a selection component 626. While the components are described with respect to the user device 506, they are capable of operating as part of the video content item provider 504.

The video player component 625 receives and plays video content items from the video provider 504. The video player component 625 may be one of many video media players available, such as Windows® Media Player, QuickTime® Player, or iTunes®

The selection component 626 receives selections to objects in the video content item played through the video player component 625. The selection component 626 may receive the selections made to a frame displayed in the video player component 625. The selection component 626 may compare coordinates associated with a received selection with the locations of objects in the frame to determine if a selection has been made to an object.

Figure 7:
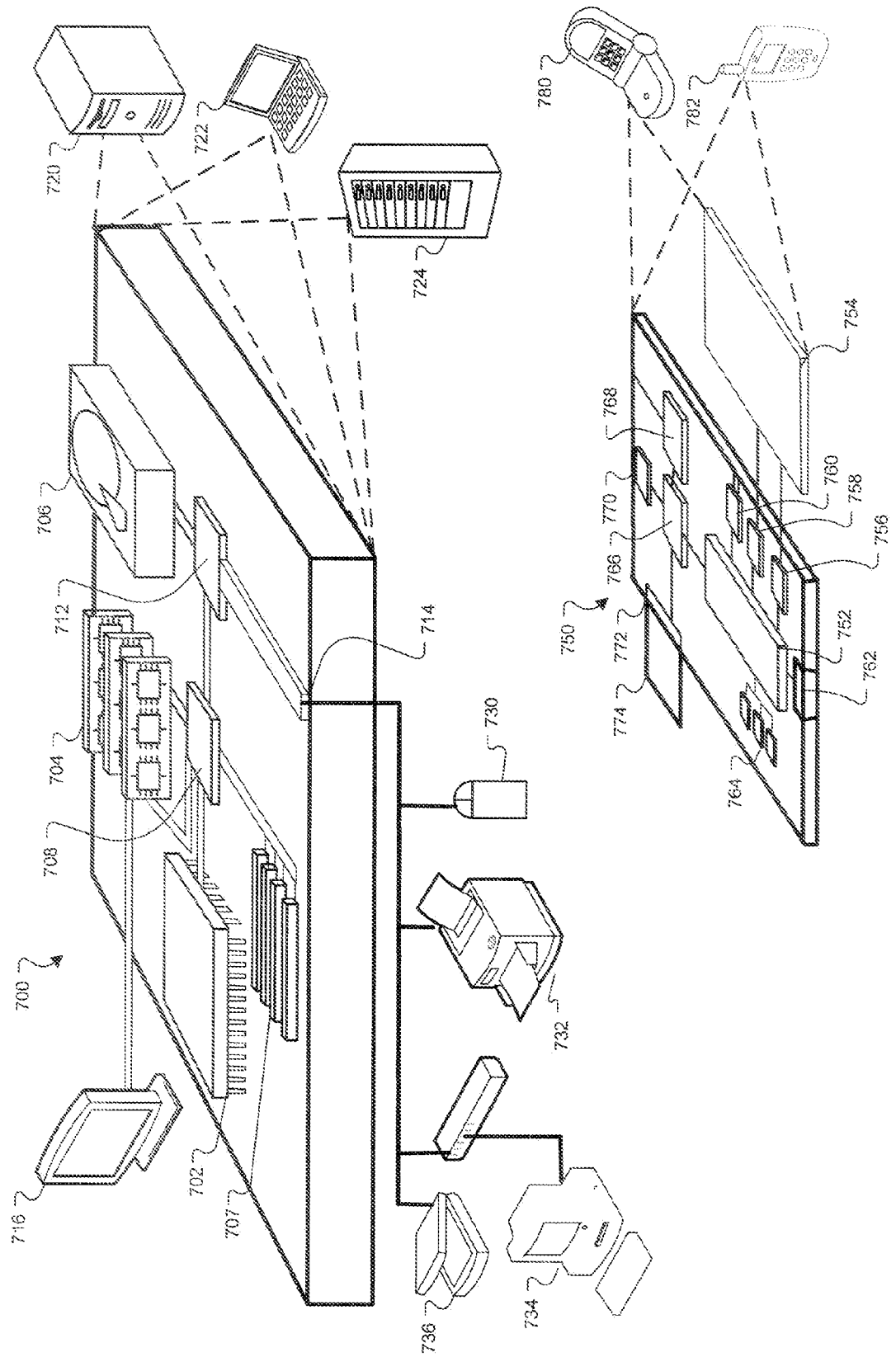
FIG. 7 is a block diagram illustrating an example generic computer and an example generic mobile computer device.

FIG. 7 shows an example of a generic computer device 700 and a generic mobile computer device 750, which may be used with the techniques described above. Computing device 700 is intended to represent various forms of digital computers, such as laptops, desktops, workstations, personal digital assistants, television set-top boxes, servers, blade servers, mainframes, and other appropriate computers. Computing device 750 is intended to represent various forms of mobile devices, such as personal digital assistants, cellular telephones, smartphones, and other similar computing devices. The components shown here, their connections and relationships, and their functions, are meant to be exemplary only, and are not meant to limit the implementations described and/or the claims.

Computing device 700 includes a processor 702, memory 704, a storage device 706, a high-speed interface 708 connecting to memory 704 and high-speed expansion ports 710, and a low speed interface 712 connecting to low speed bus 714 and storage device 706. Each of the components 702, 704, 706, 708, 710, and 712, are interconnected using various buses, and may be mounted on a common motherboard or in other manners as appropriate. The processor 702 can process instructions for execution within the computing device 700, including instructions stored in the memory 704 or on the storage device 706 to display graphical information for a GUI on an external input/output device, such as display 716 coupled to high speed interface 708. In other implementations, multiple processors and/or multiple buses may be used, as appropriate, along with multiple memories and types of memory. Also, multiple computing devices 700 may be connected, with each device providing portions of the necessary operations (e.g., as a server bank, a group of blade servers, or a multi-processor system).

The memory 704 stores information within the computing device 700. In one implementation, the memory 704 is a volatile memory unit or units. In another implementation, the memory 704 is a non-volatile memory unit or units. The memory 704 may also be another form of computer-readable medium, such as a magnetic or optical disk.

The storage device 706 is capable of providing mass storage for the computing device 700. In one implementation, the storage device 706 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 704, the storage device 706, memory on processor 702, or a propagated signal.

The high speed controller 708 manages bandwidth-intensive operations for the computing device 700, while the low speed controller 712 manages lower bandwidth-intensive operations. Such allocation of functions is exemplary only. In one implementation, the high-speed controller 708 is coupled to memory 704, display 716 (e.g., through a graphics processor or accelerator), and to high-speed expansion ports 710, which may accept various expansion cards (not shown). In the implementation, low-speed controller 712 is coupled to storage device 706 and low-speed expansion port 714. The low-speed expansion port, which may include various communication ports (e.g., USB, Bluetooth, Ethernet, wireless Ethernet) may be coupled to one or more input/output devices, such as a keyboard 734, a pointing device 730, a scanner 736, a printer 732 or a networking device such as a switch or router, e.g., through a network adapter.

The computing device 700 may be implemented in a number of different forms, as shown in the figure. For example, it may be implemented as a standard server 720, or multiple times in a group of such servers. It may also be implemented as part of a rack server system 724. In addition, it may be implemented in a personal computer such as a laptop computer 722. Alternatively, components from computing device 700 may be combined with other components in a mobile device (not shown), such as device 750. Each of such devices may contain one or more of computing device 700, 750, and an entire system may be made up of multiple computing devices 700, 750 communicating with each other.

Computing device 750 includes a processor 752, memory 764 an input/output device such as a display 754, a communication interface 766, and a transceiver 768, among other components. The device 750 may also be provided with a storage device, such as a microdrive or other device, to provide additional storage. Each of the components 750, 752, 764, 754, 766, and 768, are interconnected using various buses, and several of the components may be mounted on a common motherboard or in other manners as appropriate.

The processor 752 can execute instructions within the computing device 750, including instructions stored in the memory 764. The processor may be implemented as a chipset of chips that include separate and multiple analog and digital processors. The processor may provide, for example, for coordination of the other components of the device 750, such as control of user interfaces, applications run by device 750, and wireless communication by device 750.

Processor 752 may communicate with a user through control interface 758 and display interface 756 coupled to a display 754. The display 754 may be, for example, a TFT LCD (Thin-Film transistor Liquid Crystal Display) display or an OLED (Organic Light Emitting Diode) display, or other appropriate display technology. The display interface 756 may comprise appropriate circuitry for driving the display 754 to present graphical and other information to a user. The control interface 758 may receive commands from a user and convert them for submission to the processor 752. In addition, all external inter face 762 may be provide in communication with processor 752, so as to enable near area communication of device 750 with other devices. External interface 762 may provide, for example, for wired communication in some implementations, or for wireless communication in other implementations, and multiple interfaces may also be used.

The memory 764 stores information within the computing device 750. The memory 764 can be implemented as one or more of a computer-readable medium or media, a volatile memory unit or units, or a non-volatile memory unit or units. Expansion memory 774 may also be provided and connected to device 750 through expansion interface 772, which may include, for example, a SIMM (Single In Line Memory Module) card interface. Such expansion memory 774 may provide extra storage space for device 750, or may also store applications or other information for device 750. Specifically, expansion memory 774 may include instructions to carry out or supplement the processes described above, and may include secure information also. Thus, for example, expansion memory 774 may be provide as a security module for device 750, and may be programmed with instructions that permit secure use of device 750. In addition, secure applications may be provided via the SIMM cards, along with additional information, such as placing identifying information on the SIMM card in a non-hackable manner.

The memory may include, for example, flash memory and or NVRAM memory, as discussed below. In one implementation, a computer program product is tangibly embodied in an information carrier. The computer program product contains instructions that, when executed, perform one or more methods such as those described above. The information carrier is a computer- or machine-readable medium, such as the memory 764, expansion memory 774, memory on processor 752, or a propagated signal that may be received, for example, over transceiver 768 or external interface 762.

Device 750 may communicate wirelessly through communication interface 766), which may include digital signal processing circuitry where necessary. Communication interface 766 may provide for communications under various modes or protocols, such as GSM voice calls, SMS, EMS, or MMS messaging, CDMA, TDMA, PDC, WCDMA. CDMA2000, or GPRS, among others. Such communication may occur, for example, through radio-frequency transceiver 768. In addition, short-range communication may occur, such as using a Bluetooth, WiFi, or other such transceiver (not shown). In addition, GPS (Global Positioning System) receiver module 770 may provide additional navigation- and location-related wireless data to device 750, which may be used as appropriate by applications running on device 750.

Device 750 may also communicate audibly using audio codec 760 which may receive spoken information from a user and convert it to usable digital information. Audio codec 760 may likewise generate audible sound for a user, such as through a speaker, e.g., in a handset of device 750. Such sound may include sound from voice telephone calls, may include recorded sound (e.g., voice messages, music files, etc.) and may also include sound generated by applications operating on device 750.

The computing device 750 may be implemented in a number of different forms, as shown in the figure. For example, it may be implemented as a cellular telephone 780. It may also be implemented as part of a smartphone 782, personal (digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to a storage system, at least one input device, and at least one output device.

These computer programs (also known as programs, software, software applications or code) include machine instructions for a programmable processor, and can be implemented in a high-level procedural and/or object-oriented programming, language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instruction as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD) (liquid crystal display) monitor) for displaying information to the user and a keyboard and a pointing device (e.g., a mouse or a trackball) by which the user can provide input to the computer. Other kinds of devices call be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"). a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

Although the concepts and techniques described above generally have been described with respect to an object shown in a video as a product and the presentation of an advertisement in the form of it web page or a video, the concepts and techniques may be applied to other contexts. For example, an "object" in the video may be a face of a famous person and the presentation of other content may be a web site, video, audio or other type of presentation made available by a fan club or promoter of the famous person. In another example, the object in the video may be associated through a tag to the presentation of other information related to the object, such as factual information or commentary.

Also, the concepts and techniques described above generally have been described with respect to a video content provider adding tags to a video, the concepts and techniques may be applied to other contexts. For example, a video uploaded to a video sharing service (Such as You Tube™) may be associated with tags provided by the individual providing the video to the video sharing service.

A number of implementations have been described. Nevertheless it will be understood that various modifications may be made. For example, various forms of the flows shown above may be used, with steps reordered, added, or removed. Other implementations are within the scope of the following claims.

What is claimed is:

1. A method comprising:
    receiving, by one or more computers, representations of a plurality of objects;
    receiving, by the one or more computers, tag data, wherein the tag data comprises one or more references to one or more media content items;
    for each of the plurality of objects, locating, by the one or more computers, the object in a frame of a video content item, wherein the tag data is associated with the located objects; and
    providing, by the one or more computers, the video content item, including the tag data associated with the located objects, to a user device that provides a user interface for a concurrent display of the video content item in a first display area and the located objects that are displayed during a presentation of the video content item in a second display area, and wherein the association of the tag data with the located objects cause the display of each located object to persist in the second display area after the located object is no longer displayed during the presentation of the video content item in the first display area.

2. The method of claim 1, wherein the one or more media content items comprises a web page, an audio content item, or a video content item.

3. The method of claim 1, wherein the one or more media content items comprises a sponsored-content item associated with at least one of the plurality of objects.

4. The method of claim 1, wherein the plurality of objects comprises a product and the one or more media content items comprises an advertisement promoting the product.

5. The method of claim 1, wherein the plurality of objects comprises a face and the one or more media content items comprises a web page associated with a human identified by the face.

6. The method of claim 1, wherein at least one of the representations of the plurality of objects comprises one or more images of an object.

7. A computer program product, tangibly embodied in a machine readable medium, the computer program product comprising instructions that, when read by a machine, cause a data processing apparatus to:
    receive indications of objects included in frames of a video content item, wherein each of the objects is associated with a tag comprising a reference to a media content item, and wherein the tag is associated with an additional frame of the video content item that includes the object; and
    provide the video content item, including the tags associated with the objects and associated with the frames of the video content item, to a user device that provides a user interface for a concurrent display of the video content item in a first display area and the objects that are displayed during a presentation of the video content item in a second display area, and wherein the association of the tags with the objects cause the display of each object to persist in the second display area after the object is no longer displayed during the presentation of the video content item in the first display area.

8. The computer program product of claim 7, wherein the media content items comprise a web page, an audio content item, or a video content item.

9. The computer program product of claim 7, wherein the media content items comprise a sponsored-content item associated with the corresponding object.

10. The computer program product of claim 7, wherein the objects comprise a representation of a product and the media content items comprise an advertisement promoting the product.

11. The computer program product of claim 7, wherein the objects comprise a representation of a face and the media content items comprise a web page associated with a human identified by the representation of the face.

12. The computer program product of claim 7, further comprising instructions that, when read by a machine, cause a data processing apparatus to:
    identify a frame in an additional video content item that includes at least one of the objects; and
    associate the tag associated with the at least one of the objects with the identified frame of the additional video content item.

13. The computer program product of claim 7, further comprising instructions that, when read by a machine, cause a data processing apparatus to:
    preprocess the video content item to identify each occurrence of at least one of the objects in the video content item and to associate an identifier of an additional occurrence of the at least one of the objects with the video content item, and
    process the identifier of the additional occurrence of the at least one of the objects to identify an additional frame of the video content item that includes the object.

14. A computer program product, tangibly embodied in a machine readable medium, the computer program product comprising instructions that, when read by a machine, cause a data processing apparatus to:
    receive representations of a plurality of objects;
    receive tag data, wherein the tag data comprises references to one or more media content items;
    for each of the plurality of objects, locate the object in a frame of a video content item, wherein the tag data is associated with the located object in the frame of the video content item; and
    provide the video content item, including the tag data associated with the located objects, to a user device that provides a user interface for a concurrent display of the video content item in a first display area and the located objects in a second display area, and wherein the association of the tag data with the located objects cause the display of each located object to be presented in the second display area upon presentation of the video content item in the first display area and cause the display of each located object to persist in the second display area during the presentation of the video content item in the first display area.

15. The computer program product of claim 14, wherein the one or more media content items comprises a web page, an audio content item, or a video content item.

16. The computer program product of claim 14, wherein the one or more media content items comprises a sponsored-content item associated with at least one of the plurality of objects.

17. The computer program product of claim 14, wherein the plurality of objects comprise a product and the one or more media content items comprises an advertisement promoting the product.

18. The computer program product of claim 14, wherein the plurality of objects comprise a face and the one or more media content items comprises a web page associated with a human identified by the face.

19. The computer program product of claim 14, wherein the representations of the plurality of objects comprise one or more images of an object.

20. A method for associating a tag with an object in a video content item comprising:
  receiving, by one or more computers, an indication of a human face represented in a frame of a video content item;
  associating, by the one or more computers, tag data with the human face representation, wherein the tag data comprises a reference to a web page associated with a human identified by the human face representation in the frame;
  identifying, by the one or more computers, an additional frame of the video content item that includes the human face representation; and
  associating, by the one or more computers, the tag data with the identified additional frame of the video content item.

* * * * *